(12) United States Patent
Ramharter et al.

(10) Patent No.: US 6,978,725 B2
(45) Date of Patent: Dec. 27, 2005

(54) PROCESS AND APPARATUS FOR TREATING BIOGENIC RESIDUES, PARTICULARLY SLUDGES

(75) Inventors: Peter Michael Ramharter, Niederosterreich (AT); Harald Bayer, Niederosterreich (AT)

(73) Assignee: Tecon Engineering GmbH, Niederosterreich (AT)

( * ) Notice: Subject to any disclaimer, the term of this patent is extended or adjusted under 35 U.S.C. 154(b) by 0 days.

(21) Appl. No.: 10/840,976

(22) Filed: May 7, 2004

(65) Prior Publication Data

US 2005/0247245 A1    Nov. 10, 2005

(51) Int. Cl.[7] ................................................ F23B 7/00
(52) U.S. Cl. ........................ 110/341; 110/233
(58) Field of Search .................. 110/341, 224, 225, 110/342, 346, 233, 234; 210/770, 774; 34/93

(56) References Cited

U.S. PATENT DOCUMENTS

| | | | | |
|---|---|---|---|---|
| 4,330,411 A | * | 5/1982 | Florin et al. ................. | 210/769 |
| 4,846,082 A | * | 7/1989 | Marangoni ................... | 110/234 |
| 5,254,797 A | * | 10/1993 | Imoto et al. ................ | 423/240 S |
| 5,535,528 A | * | 7/1996 | Finkam ........................ | 34/378 |

FOREIGN PATENT DOCUMENTS

| AT | 411 254 B | 11/2003 |
|---|---|---|
| DE | 4407536 A1 | 9/1995 |
| EP | 0423400 A1 | 4/1991 |
| EP | 0423400 B1 | 4/1994 |
| EP | 0927703 A2 | 7/1999 |
| EP | 0927703 A3 | 3/2000 |
| EP | 1081101 A1 | 3/2001 |

* cited by examiner

*Primary Examiner*—Kenneth Rinehart
(74) *Attorney, Agent, or Firm*—Adams Evans P.A.

(57) ABSTRACT

The invention relates to a process and apparatus for treating biogenic residues, particularly sludges, preferably in the area of a clarification plant. Biogenic residues with a variable dry substance are subjected to aerobic drying until an energy-independent thermal treatment can be carried out. During the drying process, evaporated water is discharged in an odor-free condition without releasing freely volatile components, the dried sludge is intermediately stored a number of times and then utilized in preferably a number of successive thermal treatment steps. The two-stage cleaning of the stream of waste gas includes a dust collection unit and an adsorption unit. The waste heat is recycled through a heat exchanger to generate heat and electricity. The apparatus for carrying out the process includes a wet sludge storage container (1), a low temperature drying system (2), storage containers (3, 5) for intermediate storage of the dried biogenic residues, and a thermal treatment system with one or more thermal treatment steps (7, 8). Cleaning of the flue gas takes place preferably by means of a primary cleaning step (10) and a secondary cleaning step (11) for adsorption, for example, with clarified water. Energy recovery (9) from the hot waste gas is ideally carried out before the flue gas cleaning.

20 Claims, 3 Drawing Sheets

PROCESS AND APPARATUS FOR TREATING BIOGENIC RESIDUES, PARTICULARLY SLUDGES

TECHNICAL FIELD AND BACKGROUND OF THE INVENTION

The invention relates to a process for treating biogenic residues, particularly sludges, preferably in the area of a clarification plant, as well as an apparatus for carrying out the process with arrangements for drying and incinerating the biogenic residues. Sludges from municipal sewage clarification or industrial plants are subjected at central plants to industrial conditioning for reutilization or conversion into product gas, for example. The sometimes high fraction of biogenic residues in the sludges makes it quite difficult to use them again. Substitution materials added for stabilization generally just increases the volumes of waste for disposal. Disposal itself on dumps and in agriculture is limited in terms of volume the usage thereof is prevented especially because of pollutants in the sludge as well as the trend to biological farming.

In the known processes, drying of the material is generally carried out at high temperatures for subsequent charging into incinerators. Because of the operating conditions, the off-gas from the drying units has a disagreeable odor and it is also fed back to the incinerator. Therefore, the moisture first removed from the process is added back which makes the overall process absurd from the standpoint of the energy balance.

Transporting the sludges to central plants generally entails high costs. One major drawback in particular of the known processes for drying the sludge followed by thermal treatment is particularly the fact that exhaust air generated in the drying process is conducted to the incinerator because of increased fractions of pollutants. Contrary to the desired effect of adding energy to the drying unit, the drying step is carried out here ad absurdum because the removal of water from the process is only apparent since it now has to be heated or evaporated again.

AT 408 509 B, for example, describes a process for drying and incinerating sludge, particularly sewage sludge, using a fluidized bed dryer which is heated with waste gas from the incinerator. The water-enriched air coming from the dryer is recycled to the incinerator. Full evaporation of this air requires the same amount of energy as without drying. Moreover, the rapid and hot drying, usually in fluidized bed driers, causes not inconsiderable bad odors. In order to suppress them as much as possible, the gases generated have to undergo treatment again.

Processes working with thermal disintegration of cells, generally with high-pressure draining and pyrolysis, also need a high fraction of energy for heating. Moreover, these processes also have the problem of odors and thus are not a solution either. Even when a large amount of water is removed, processes providing only for drying the input material do not yield material that can be recycled or dumped.

Finally, known methods for treating sludges at temperatures up to approximately 600° C. do not provide a solution because they do not ensure complete conversion of hazardous materials such as residue from pharmaceuticals.

SUMMARY OF THE INVENTION

The object of the invention is thus to provide a process which avoids known drawbacks and makes sure a decentralized treatment of biogenic residues, particularly sludges with full conversion of the energy content stored in the sludge charged.

The invention achieves this object by means of a process characterized by the following process steps:
 a) Collection of biogenic residues with variable dry substance content followed by aerobic drying in a temperature range up to a maximum of 60–70° C.,
 b) Maintenance of drying until reaching a level of drying of the biogenic residues which permits energy-independent incineration,
 c) Discharging with the moist stream of air only amount of the water evaporated during drying without the release of freely volatizing compounds in order to avoid the generation of odors,
 d) Primary intermediate storage of the dried material, particularly for equalization of different drying stages,
 e) Secondary intermediate storage of the dried material as a buffer.
 f) Thermal treatment of the material and possibly of substitution materials in preferably a number of successive thermal treatment steps,
 g) Discharging of combustion products from optionally each of the thermal treatment steps,
 h) Cleaning of the streams of material arising during thermal treatment in primary and secondary cleaning steps, the material stream being filtered in the primary step, especially by means of dust collection, and by adsorption of the stream in the secondary cleaning step,
 i) Recovering energy from all material streams brought out of the process, particularly by conducting the energy to a heat transfer medium.

The process offers treatment of biogenic residues that is efficient in terms of energy, sustained and decentralized. The energy needed for carrying out the process is fully covered by energy recovery. Surplus energy is recycled internally or externally. The process is especially suitable for use in municipal sewage systems, creating synergies.

Since the process treats sludges with variable dry substance contents, the existing sludge dewatering can be operated in an optimal way and does not have to be run to capacity limits.

The process treats sludges of any consistency. It is also possible to mix different sludges, with or without digestion, or even with industrial sludges.

Exclusively aerobic drying in a low temperature range up to a maximum of 60 to 70° C. ensures that disagreeable odors will not escape to the environment. This eliminates the need for steps to avoid them. Depending on their reutilization, the biogenic residues are dried only up to the point where their subsequent further thermal treatment can be carried out under energy-independent conditions. The energy gained thereby is recycled by means of waste heat utilization in that the overall process needs can be met and the heat requirement of neighboring operating systems, local heating networks, etc, can also be covered.

Unnecessary energy inputs are avoided. The maximum operating temperature is determined as a function of the pollutants contained in the sludge and on the temperatures needed to set them free.

The water evaporated is dissipated to the environment directly through the "cold" drying used. In contrast to this, the known "hot" drying method generally conducts the evaporated water following a condensation step once again to the burner where it is evaporated again. The "cold" drying method also avoids any release of freely volatizing compounds. Water is all that is withdrawn from the system so disagreeable odors are ruled out.

Drying is preferably carried out with the addition of fresh air or also with a supply of heat within the temperature range mentioned. If need be aerobic re-stabilization of the sludge is carried out. Following drying, the material is transferred to a primary intermediate storage container, particularly for equalization of drying steps having different durations and possibly for homogenization of the material after drying. The equalization is necessary because other biogenic residues such as green cuttings or sludge can also be supplied. The latter need not be dried but are simply added undried.

In the secondary intermediate storage container, the material is buffered, for example, to counter conveyance problems in the transfer of material from the primary storage container to the buffer storage. Material reserves are formed which ensures continuity of the process over an extended period of time even if there is a stoppage of material flow.

The thermal treatment carried out in a number of steps makes it possible to carry out individual adjustments of the process to different moisture contents of the material to be treated as well as complete decomposition of any pollutants.

Material can be withdrawn from any of the thermal treatment steps depending on the further use of the product. The energy recovery system consists essentially of a heat exchanger which uses the energy from the hot waste gas to produce hot water and/or electricity.

The waste gas generated undergoes separate secondary treatment. Particles are filtered out of the waste gas stream and there is adsorption of the pollutants possibly therein. A dry, wet or semi-dry process is used depending on the composition of the pollutants which are introduced with the sludge. According to a further feature of the invention, the starting material used is wet or previously dewatered sludge, whereby the dry substance content can be between 2% and 35%.

The invention also provides that the dry air needed for drying the biogenic residues is preheated by the waste heat of the thermal treatment steps. The stream of air needed for drying is preheated by the waste heat from the thermal treatment unit. Drying can thus be carried out in an optimum way in terms of energy. The preheated and dry air introduced into the drying unit is then discharged together with the stream of water produced as a moist stream of air and dissipated in the environment. According to a further feature of the invention, provision is made so that the thermal treatment of the biogenic residues is carried out without an additional external supply of energy. Another feature of the invention is that the maximum dewatering of the biogenic residues takes place only up to when a downstream energy-independent thermal utilization can be carried out. The idea here is that the drying is to be carried out only up to where the condition is reached where thermal treatment can proceed without an additional supply of energy. However, it is also quite possible to vary the amount of energy available at the end of the process by making free adjustments as a function of the fraction of the dry substance mentioned.

The invention also provides that homogenization of the material takes place in the primary intermediate storage container, that additional biogenic material is supplied to the primary intermediate storage container and that dried biogenic residues are discharged from the primary intermediate storage container and supplied to an external application.

A further characteristic of the invention is that the thermal treatment comprises at least one primary and one secondary thermal treatment step and that substitution materials are supplied before the primary thermal treatment.

Another feature of the invention provides that substitution materials are supplied directly to the primary thermal treatment step, and that sterilization of the material takes place in at least one of the thermal treatment steps.

Another feature of the invention is that the following example agents are provided for adsorption in the second cleaning step: lime, sodium carbonate, hydrate of white lime, activated charcoal, soda and sorbalite.

A further feature of the invention provides that water from the settling basin is used for cleaning waste gas, the streams of material being conducted for adsorption through the waste water basin of the sewage treatment plant.

Another feature of the invention is that treated waste water is injected into the stream of material. Sewage treatment water is used in both cases instead of operating plant water. Utilization of existing resources brings about cost savings.

A further feature of the invention is that the waste gas cleaning is carried out by separating the stream of material into its components. The components can then be processed further. For example, the remaining $C_xH_y$ can be used for fuel cells.

The invention also provides that the energy of the waste gases is conducted to one or more heat exchangers for production of either electricity or hot water, and that the hot water can be used for heating the drying or combustion air. A final feature of the invention is that the hot water is used for a decentralized heating network. It can be to advantage to use this water to supply a local or a long-distance heating network.

The invented apparatus is characterized in that a wet sludge storage container is located upstream of the drying system, that the drying arrangement is a low temperature drying system operating in a maximum range of 60 to 70° C., that storage containers for intermediate storage of dried biogenic residues are provided, that a transfer system for the dried biogenic residues is provided between the storage containers, that the thermal treatment system comprises two separate thermal treatment zones, that heat exchanger systems for receiving and reusing energy withdrawn from the system and/or released are located downstream of the thermal treatment system, and by the provision of at least a first cleaning system, preferably a dust collector, for a first cleaning of the flue gases and a second cleaning system for further waste gas cleaning.

In a further development, the invention provides that the drying system is a cold-air or fresh-air dryer or a solar dryer or consists of drying fields.

The invention also provides arrangements for discharging moist air and the stream of water from the drying system.

A further feature of the invention is that the primary storage container for intermediate storage is a homogenization storage container and that the secondary storage container is a buffer storage container for securing a continuous thermal treatment.

The material transfer between the two storage containers can be carried out manually or automatically. Control of the homogenization is possible depending on the conveyance process selected.

In a further feature, the invention provides that the primary storage container comprises a feeder arrangement for further biogenic residues which can be green cuttings or sludge, for example.

In a further feature of the invention, the primary storage container also has an arrangement for discharging the material. Sludge discharged in this phase can be used in thermal power plants or cement factories, for example, depending on the degree of homogenization.

A further feature of the invention is that a system for supplying substitution material is provided between the secondary storage container and the thermal treatment system. These substitution materials can be green cuttings or screenings from the sewage treatment plant. It is also suitable to add materials for sterilization or to apply steps specially tailored to the thermal treatment.

According to a further feature of the invention, the thermal treatment system is operated with natural gas and/or sewer gas. The burners of the thermal plant are designed for using both natural gas and sewer gas. The use of sewer gas is especially recommended for the case where large amounts of sewer gas are produced in connection with the plant; this will optimize the energy balance of the plant.

If the amount of sewer gas is not adequate or if technical problems can lead to a shortage of sewer gas, the burners can be operated with natural gas. The use of natural gas thus promotes plant reliability.

A further feature of the invention provides that the thermal treatment system also has an arrangement for ash removal which preferably is a water-cooled screw conveyor.

According to the invention, the hot waste gases discharged from the thermal treatment system first run through a dust collector, preferably ceramic filter cartridges, hot gas filters, a hot gas cyclone, electric filters, coated filter cloths or other materials that are heat resistant and suitable for filtering, whereby a discharge arrangement for the dust is provided. In a further arrangement, the invention provides that the waste gas cleaning system comprises a ventilation system conducting the waste gases into the settling basin. It is important here to ensure that the cleaning capability of the sewage treatment plant is not adversely affected.

A further feature of the invention is that the waste gas cleaner comprises a system for injecting clarified water into the stream of waste gas. The use of water from the sewage treatment plant instead of common process water means a cost saving in any case because of the use of existing resources.

The invention also provides that the waste gas cleaner comprises an arrangement for separation of the waste gas into its components.

A further feature of the invention is that arrangements are provided for further conducting of the heat transfer medium to the low temperature drying system as well as the thermal treatment system and that the arrangement for further conducting of heat to the low temperature drying system as well as the thermal treatment system is provided with a thermostat. This brings about continuous support of the drying and an internal reuse of surplus heat. Ideally, the thermostat is designed in combination with a heat exchanger. Exclusively dried and preheated air is fed to both the low temperature drying system and the thermal treatment system. If no additional energy is required, especially in the low temperature drying system, the energy is either exhausted or recirculated.

Another feature of the invention is that a power-heat coupler for coupled production of electricity and hot water is provided, that the power-heat coupler is based on the ORC process, and that the generator of the power-heat coupler is a micro gas turbine. Moreover, a steam piston engine, screw-type engine operated by steam or a steam turbine can also be operated therewith. A Stirling engine can also be used.

According to a further feature of the invention, an arrangement for transferring hot water to an arrangement for utilization of hot water is provided, preferably a decentralized thermal network. The heat exchanger an also produce hot water without being routed through a heat transfer medium.

The type of further use of the energy gained from the hot waste gases depends especially on the size of the plant and the resulting energy content of the waste gases and the location of the plant. Hot water production should be selected in the case a large requirement for water for internal heating purposes of the sewage treatment plant, e.g., for the digestion tower, tempering of the basin water or of the operations building or designing a long-distance heating network to provide short-distance service as well. The variant of a coupled power and hot water production is suitable particularly for self-supply of the plant. Possible systems for power-heat coupling are described above.

BRIEF DESCRIPTION OF THE DRAWINGS

The invention is explained in more detail below using an example embodiment of the invention along with the attached drawing in which.

DESCRIPTION OF THE PREFERRED EMBODIMENT AND BEST MODE

Figure 1:
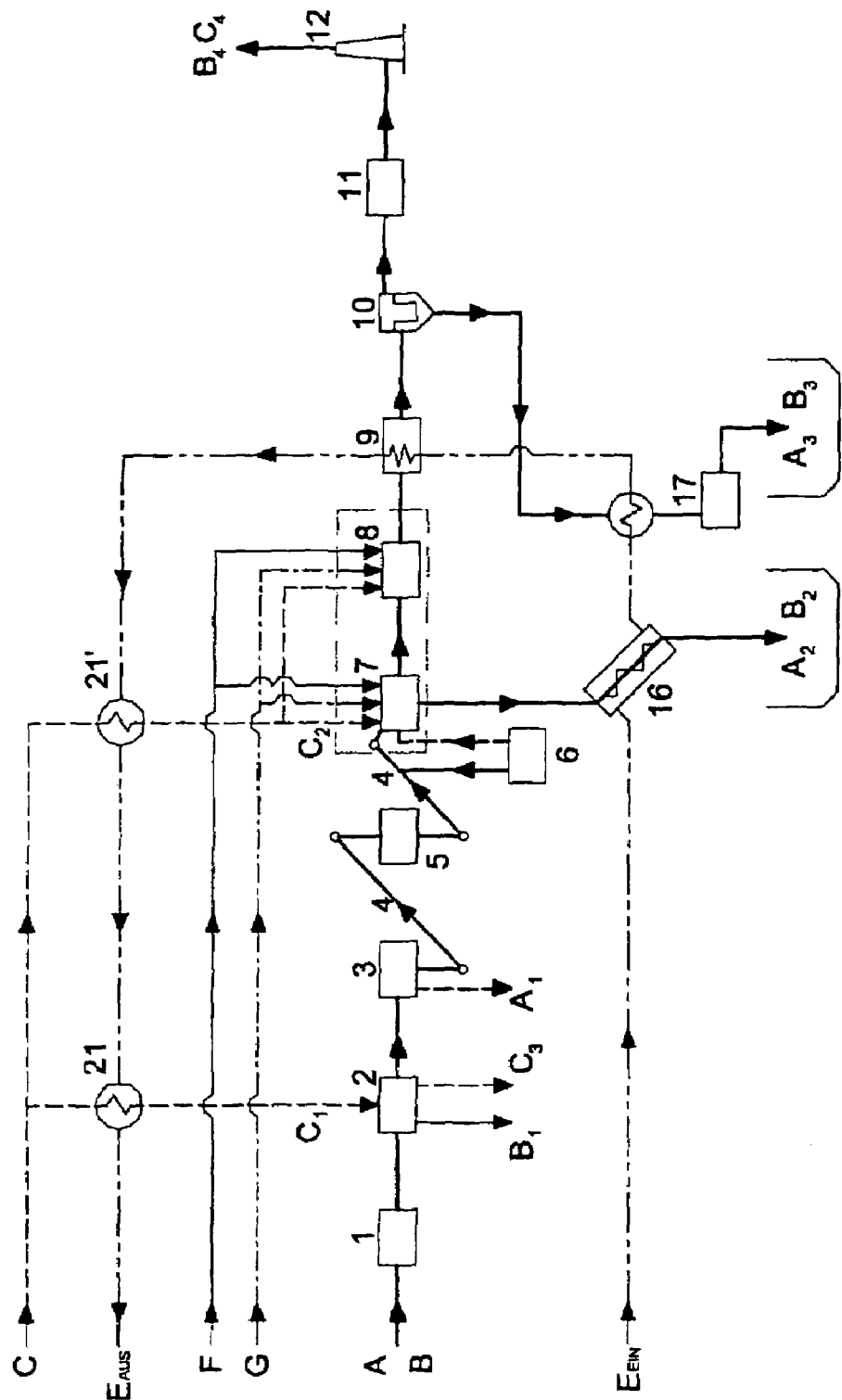
FIG. 1 is a schematic representation of the apparatus according to the invention.

Referring now specifically to the drawings, wet sludge consisting of dry sludge A and supplied water B is fed to the wet sludge storage container 1 and stored intermediately there. In general, the wet sludge storage container can accommodate sludges having any consistency. Provision is also made for mixing of sludges with different consistencies.

The sludge is fed from the wet sludge storage container 1 to the drying unit. Drying is carried out by means of a low temperature drying system 2 which dries the sludge slowly in an environment of a maximum of 60 to 70° C. under aerobic conditions. The drying system 2 is modular in design. It is possible to increase the drying capacity and to make an adaptation for wet sludge with a higher water content. The air needed for drying is preheated by the waste heat of the thermal treatment system 7, 8 and fed to the drying system. Water B1 from the stream of wet sludge supplied is discharged from the low temperature drying system 2. The dried sludge is conducted into the primary storage container 3. The dried and preheated air C1 introduced into the drying system 2 is discharged together with the water stream B1 as a stream of moist air out of the drying system 2 and released to the environment. The drying system 2 is a solar dryer or cold-air or circulating-air dryer or else any expandable drying field. Drying is carried out in the drying system 2 only to the point where the following thermal treatment can proceed largely in an energy-independent way.

The sludge conducted out of the low temperature drying system 2 into the primary intermediate storage container 3 undergoes intermediate storage there. If necessary, further biogenic residues such as green cuttings or sludge with a different consistency are supplied. The sludge can also be discharged already from the primary storage container 3 in the stream of sludge A1. Sludge discharged here is supplied for utilization in thermal power plants or cement factories.

The sludge goes from the primary sludge container 3 via a conveyor system 4 into the secondary intermediate storage container 5. The secondary intermediate storage container 5 operating as a buffer serves for equalizing conveyance difficulties. An arrangement 6 for feeding substitution materials is provided on the way between the secondary intermediate storage container 6 and the primary thermal treatment system 7. Feeding can take place either before or into the primary thermal treatment system 7. The primary thermal treatment system 7 is flexible in its reaction to different moisture contents of the sludge to be incinerated. The stream of air C2 introduced into the thermal treatment zone is preheated before entry by energy recovered from the hot waste gases. In addition, hot ash A2 is discharged from the thermal treatment zone. The energy contained therein is dissipated through the stream of water B2 of a water-cooled screw conveyor 16. The energy gained on cooling of the ash can also remain in the system and be conducted onward with Eein.

Complete decomposition or gasification of the materials preheated in the primary thermal treatment zone 7 takes place in the secondary thermal treatment system 8 at a temperature of at least 860° C. The burners of both the primary and secondary thermal treatment systems 7, 8 are designed to operate with sewer gas G and natural gas F.

Ideally, the waste gases go from the secondary thermal treatment system 8 to the energy recovery stage 9 in order to achieve a degree of efficiency that is as high as possible. The stage 9 above is connected to the waste gas cleaning stages 10, 11. The waste gas is cleaned in a number of cleaning stages. The first stage is a dust collector 10 made of heat resistant material, preferably ceramic filter cartridges. It separates the stream of material, dust A3 from the waste gas and conducts it out of the system. A discharge arrangement 17 for the dust is provided which has a construction that gives special consideration to the ready dispersing capability of the dust. Heat can be dissipated to the outside via the stream B3 or remain in the system via Eein. The dust collector for a first cleaning of the flue gas can, instead of the ceramic filter cartridges used, be a hot gas filter, a hot gas cyclone or coated filter cloths.

The stream of waste gas from the dust collector 10 is conducted onwards to an arrangement 11 for adsorption.

Figure 3:
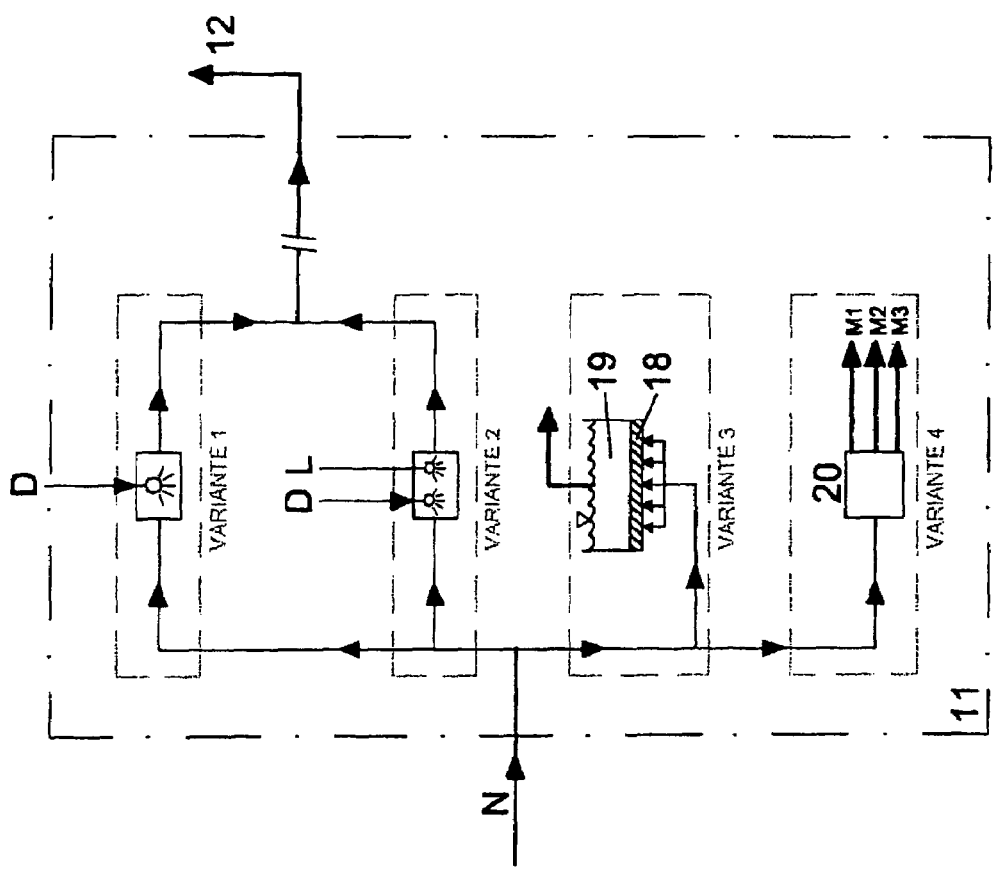
FIG. 3 is a further schematic representation of a detail in accordance with FIG. 1.

FIG. 3 shows different designs of the second cleaning system 11.

The hot stream of waste gas N can have the following possibilities:
a) A dry adsorption process in which a dry adsorption agent D such as lime is added;
b) A semi-dry process in which both dry adsorption agent D such as lime with activated carbon is added in connection with injected wash water L, e.g., industrial water or clarified water. No waste water is produced since the wash water evaporates;
c) Waste gas cleaning in the settling basin. The waste gas is conducted into the settling basin through ventilation systems 18. The pollutants in the waste gas are absorbed by the clarification water; and
d) Provided as a fourth variant is an arrangement 20 for separation of the waste gas into its components M.

Figure 2:
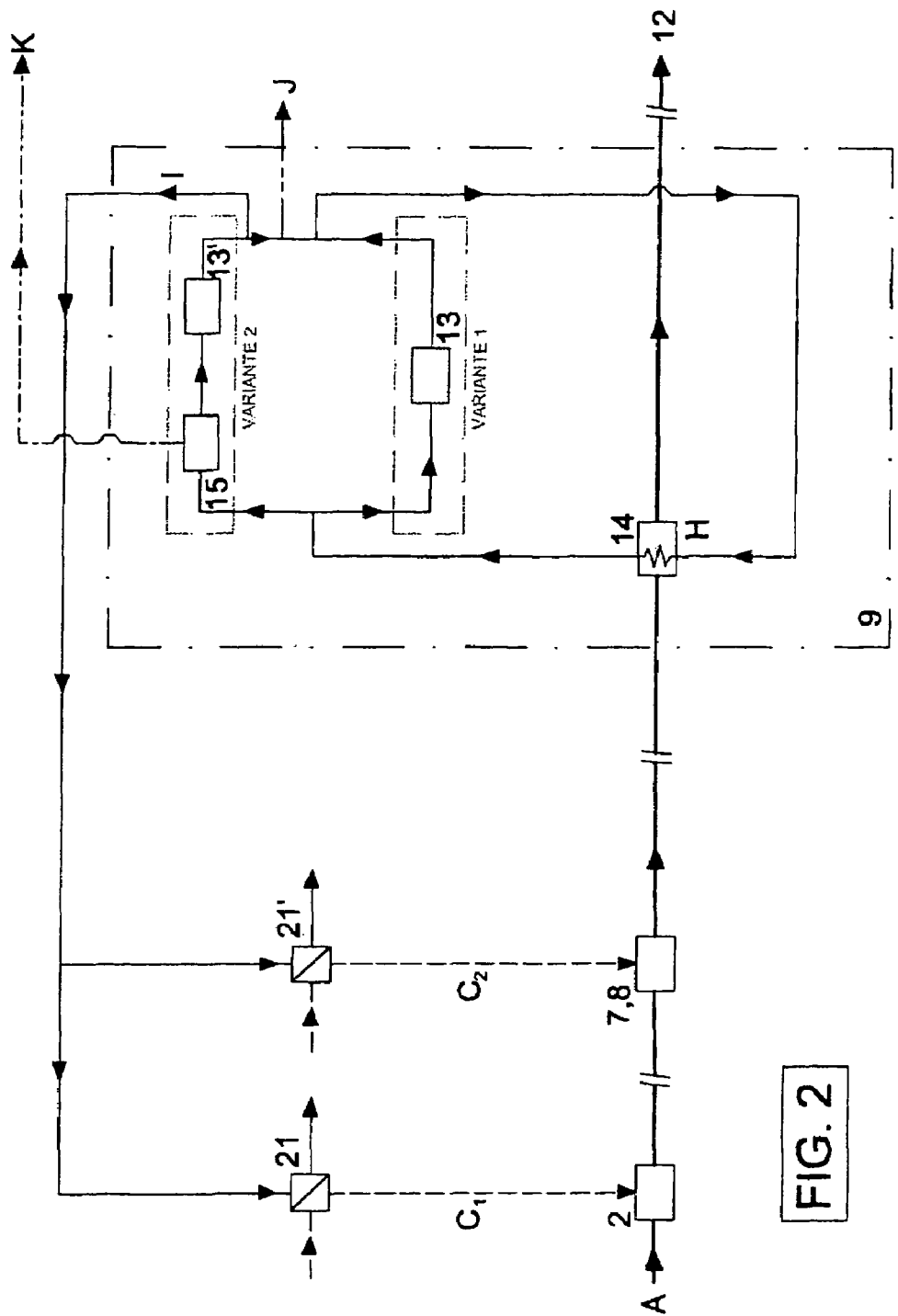
FIG. 2 is a schematic representation of a detail in accordance with FIG. 1.

A detailed representation of the energy recovery 9 is given in FIG. 2. The energy stream of the hot waste gases reaching the heat exchanger 9 is represented here in variant 1 in the form of production of just hot water 13 and in variant 2 in the form of coupled electricity generation 15 as well as the production of hot water 13'. The material streams show that the energy of the hot waste gases are transferred to a heat transfer medium H in the heat exchanger 14. The heat transfer medium serves in variant 1 for hot water production J for external use and for hot water production I for internal purposes such as the heating of drying air or combustion air.

In variant 2, there is first the generation of electricity 15 and then the production of hot water 13'. The dry air recycled to the low temperature drying system 2 and/or the thermal treatment systems 7, 8 can be adjusted by means of thermostats 21, 21' which, ideally are coupled with heat exchangers.

The heat exchanger systems 9 can also be arranged between the two waste gas cleaning systems 10, 11. The arrangement will depend, for example, on a needed cooling of the waste gas stream N before it is conducted to the cleaning system used. Waste gases leaving the system are conducted to the outside through the stack 12 by means of the material streams B4 [water] and C4 [air].

A process and assembly for disposing of sludge is described above. The description is provided for purposes of illustration, the invention being defined by the claims.

We claim:

1. Process for treating biogenic residues, particularly sludges, preferably in the area of a sewage treatment plant, characterized by the following process steps:
(a) Collecting biogenic residues with variable dry substance content followed by aerobic drying in a temperature range up to a maximum of 60–70° C.;
(b) Maintaining the drying step until reaching a level of drying of the biogenic residues which permits energy-independent utilization;
(c) Discharging with the moist stream of air only the amount of water evaporated during drying without the release of freely volatizing compounds;
(d) storing the dried material in primary intermediate storage, particularly for equalization of different drying stages;
(e) storing the dried material in a secondary intermediate storage as a buffer;
(f) thermally treating the material in a number of successive thermal treatment steps;
(g) discharging residues of the treatment from each of the thermal treatment steps;
(h) Cleaning the streams of material arising during thermal treatment in primary and secondary cleaning steps, the material stream being filtered in the primary step, especially by means of dust collection, and by adsorption of the stream in the secondary cleaning step; and
(i) recovering energy from all material streams brought out of the process by conducting the energy to a heat transfer medium.

2. Process as described in claim 1, wherein the starting material used is wet or previously dewatered sludge, whereby the dry substance can be between 2% and 35%.

3. Process as described in claim 1, wherein the dry air needed for drying the biogenic residues is preheated by the waste heat of the thermal treatment steps.

4. Process as described in claim 1, wherein the thermal treatment of the biogenic residues is carried out without an additional external supply of energy.

5. Process as described in claim 1, wherein the step of dewatering the biogenic residues is done only to that level as maximum where downstream energy-independent thermal utilization can be carried out.

6. Process as described in claim 1, wherein the homogenization of the material takes place in the primary intermediate storage container.

7. Process as described in claim 1, wherein additional biogenic material is supplied to the primary intermediate storage container.

8. Process as described in claim 1, wherein dried biogenic residues are discharged from the primary intermediate storage container and supplied to an external application.

9. Process as described in claim 1, wherein the thermal treatment comprises at least one primary and one secondary treatment step.

10. Process as described in claim 9, wherein substitution materials are supplied prior to the primary thermal treatment.

11. Process as described in claim 9 or 10, wherein substitution materials are supplied directly to the primary thermal treatment step.

12. Process as described in claim 9, wherein sterilization of the material takes place in at least one of the thermal treatment steps.

13. Process as described in claim 1, wherein selective use is made of an agent for adsorption in the second cleaning step selected from the group consisting of lime, sodium carbonate, hydrate of white lime, activated charcoal, soda and sorbalite.

14. Process as described in claim 1, wherein water from the settling basin is used for waste gas cleaning.

15. Process as described in claim 14, wherein the material streams are conducted for adsorption through the waste water basin of the sewage treatment plant.

16. Process as described in claim 14, wherein waste water is injected into the material stream.

17. Process as described in claim 1, wherein the waste gas cleaning is carried out by separating the material stream into its components.

18. Process as described in claim 1, wherein the energy of the waste gases is fed to one or more heat exchangers for the production of electricity, steam or hot water.

19. Process as described in claim 18, wherein the hot water is provided for heating the drying and combustion air.

20. Process as described in claim 18, wherein the hot water is used in a decentralized heating network.

* * * * *